US010806013B1

(12) United States Patent
Downs

(10) Patent No.: US 10,806,013 B1
(45) Date of Patent: Oct. 13, 2020

(54) LIGHT FIXTURE WITH RADIATING STRUCTURE

(71) Applicant: ABL IP Holding LLC, Atlanta, GA (US)

(72) Inventor: Steven E. Downs, Lilburn, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/530,755

(22) Filed: Aug. 2, 2019

(51) Int. Cl.
*H01Q 1/26* (2006.01)
*H05B 37/00* (2006.01)
*H05B 47/19* (2020.01)
*H01Q 1/00* (2006.01)
*H04B 1/38* (2015.01)
*F21S 8/02* (2006.01)

(52) U.S. Cl.
CPC .............. *H05B 47/19* (2020.01); *F21S 8/026* (2013.01); *H01Q 1/007* (2013.01); *H04B 1/38* (2013.01)

(58) Field of Classification Search
CPC ............. H01L 23/4093; H01L 23/4006; H01L 23/467; H01L 2023/4062; G06F 1/20; H05K 1/0206; H05K 3/0061; H05K 2201/09781; H05K 3/0058; H05B 33/0803; H05B 33/0827; H05B 33/0809; H05B 33/0821; H05B 41/34; H05B 39/09; H05B 41/28; F21Y 2101/02; G07C 9/00309; G07C 2009/00793; G07C 2209/63; G07C 9/00111; B60R 25/24
See application file for complete search history.

(56) References Cited

U.S. PATENT DOCUMENTS

| 7,162,258 | B2 | 1/2007 | Beach et al. |
| 7,247,994 | B2 | 7/2007 | Roach, Jr. |
| 7,548,216 | B2 | 6/2009 | Webb et al. |
| 7,706,757 | B2 | 4/2010 | Luglio et al. |
| 7,714,699 | B2 | 5/2010 | Wessels |
| 8,330,386 | B2 | 12/2012 | Weng |
| 8,450,670 | B2 | 5/2013 | Verfuerth et al. |
| 8,674,616 | B2 | 3/2014 | Holman et al. |
| 8,754,816 | B2 | 6/2014 | Feldstein et al. |
| 2007/0085755 | A1 | 4/2007 | Webb et al. |
| 2007/0285912 | A1 | 12/2007 | Lin |
| 2014/0125250 | A1 | 5/2014 | Wilbur |
| 2014/0204581 | A1 | 7/2014 | De Jong et al. |
| 2014/0218913 | A1 | 8/2014 | Cozzolino et al. |
| 2014/0292194 | A1 | 10/2014 | Sagal et al. |
| 2014/0300293 | A1 | 10/2014 | Ruan et al. |
| 2014/0327355 | A1 | 11/2014 | Chen et al. |
| 2017/0374724 | A1* | 12/2017 | Liszt ........................ F21K 9/238 |
| 2019/0215935 | A1* | 7/2019 | Trublowski .......... H01Q 1/2283 |

* cited by examiner

*Primary Examiner* — Minh D A
(74) *Attorney, Agent, or Firm* — Kilpatrick Townsend & Stockton LLP

(57) ABSTRACT

A system that provides communication using an antenna formed by a gap between a circuit board and a housing of a lighting fixture. A first end of the gap corresponds to a first grounding point that electrically connects the circuit board and the housing and a second end of the gap corresponds to a second grounding point that electrically connects the circuit board and the housing. The distance between the first grounding point and the second grounding point defines a length of the gap and determines an operational frequency of the antenna.

16 Claims, 6 Drawing Sheets

LIGHT FIXTURE WITH RADIATING STRUCTURE

TECHNICAL FIELD

This disclosure relates generally to the field of lighting fixtures. More specifically, this disclosure relates to using a light engine in a lighting fixture to form a radiating structure that may be used for wireless communication.

BACKGROUND

In the field of lighting fixtures, lighting fixtures that support wireless communications typically use one or more antennas. The antennas may be mounted to the housing of the lighting fixture or to a component connected to the lighting fixture. Mounting or positioning the antennas can be difficult and expensive, especially when the lighting fixture is mounted in the ceiling. One option is to cut a physical slot into the housing of a lighting fixture. However, this technique has disadvantages, including radiating efficiency and safety risks, including safety compliance issues.

Therefore, a new design that improves clarity and strength of the communication signal and reduces cost and safety risk, is provided herein.

SUMMARY

The present invention is directed to a radiating light engine. More specifically, the light engine forms an antenna in a gap between the light engine and the housing of the lighting fixture.

In one aspect of the invention, a lighting fixture includes a housing with an attached light engine. The light engine includes multiple lighting elements mounted to a circuit board. The circuit board is attached to an inner surface of the housing. The lighting fixture has a feeder connected to the circuit board. The feeder is configured to be a transceiver. The lighting fixture includes an antenna formed by a gap between a first side of the circuit board and a portion of the inner surface of the housing. The first side of the circuit board is the side of the circuit board closer to the housing. A second side of the circuit board on the opposite side of the circuit board has multiple lighting elements mounted on the circuit board. The antenna is formed by a gap where a first end of the gap corresponds to a first grounding point that electrically connects the circuit board and the inner surface of the housing and where a second end of the gap corresponds to a second grounding point that electrically connects the circuit board and the inner surface of the housing. The distance between the first grounding point and the second grounding point defines a length of the gap and determines an operational frequency of the antenna.

These and other aspects of the invention will be described in more detail and in the accompanying figures.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Briefly described, the present disclosure generally relates to a lighting fixture that forms a radiating structure or antenna that may be used for wireless communication using the lighting engine and the housing.

In a non-limiting example, a lighting fixture has a housing and a light engine that is mounted to the interior of the housing. The light engine includes a circuit board with a number of light emitting elements, such as LEDs, connected to the circuit board. The circuit board of the light engine is attached to an inner surface of the housing by one or more fasteners or other types of connectors, including adhesives and clips. An antenna is formed by a gap between the circuit board and the inner surface of the housing. The length of the gap determines an operational frequency of the antenna. The lighting fixture also has a feeder connected to the circuit board to connect the antenna to a wireless interface. The wireless interface may include a wireless transceiver and may be connected to a controller, which is located outside the housing.

Figure 1:
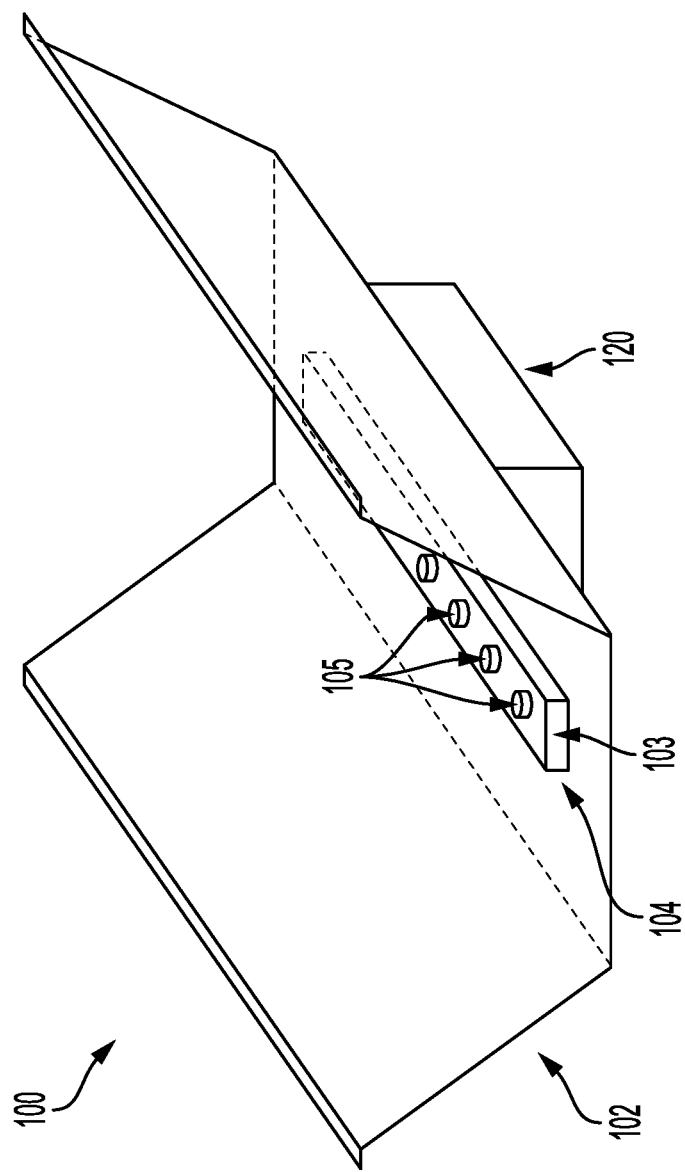
FIG. 1 depicts a perspective view of an exemplary lighting fixture with a radiating structure, according to the present disclosure.

Referring now to the figures, FIG. 1 depicts a portion of a lighting fixture with a radiating structure. The lighting fixture 100 has a housing 102 and a light engine 104. The light engine 104 includes multiple lighting elements 105 mounted to a circuit board. The light engine 104 is mounted to an inner surface of the housing 102. In this example, the inner surface of the housing is a base surface of the housing 102. FIG. 1 illustrates a controller 120 mounted to an outer surface of the housing 102. The controller 120 is connected to a feeder which provides excitation to the radiating structure as described below with regards to FIG. 3. In some configurations, the controller 120 can be located remotely from the lighting fixture and connected via a coaxial connection.

Figure 2:
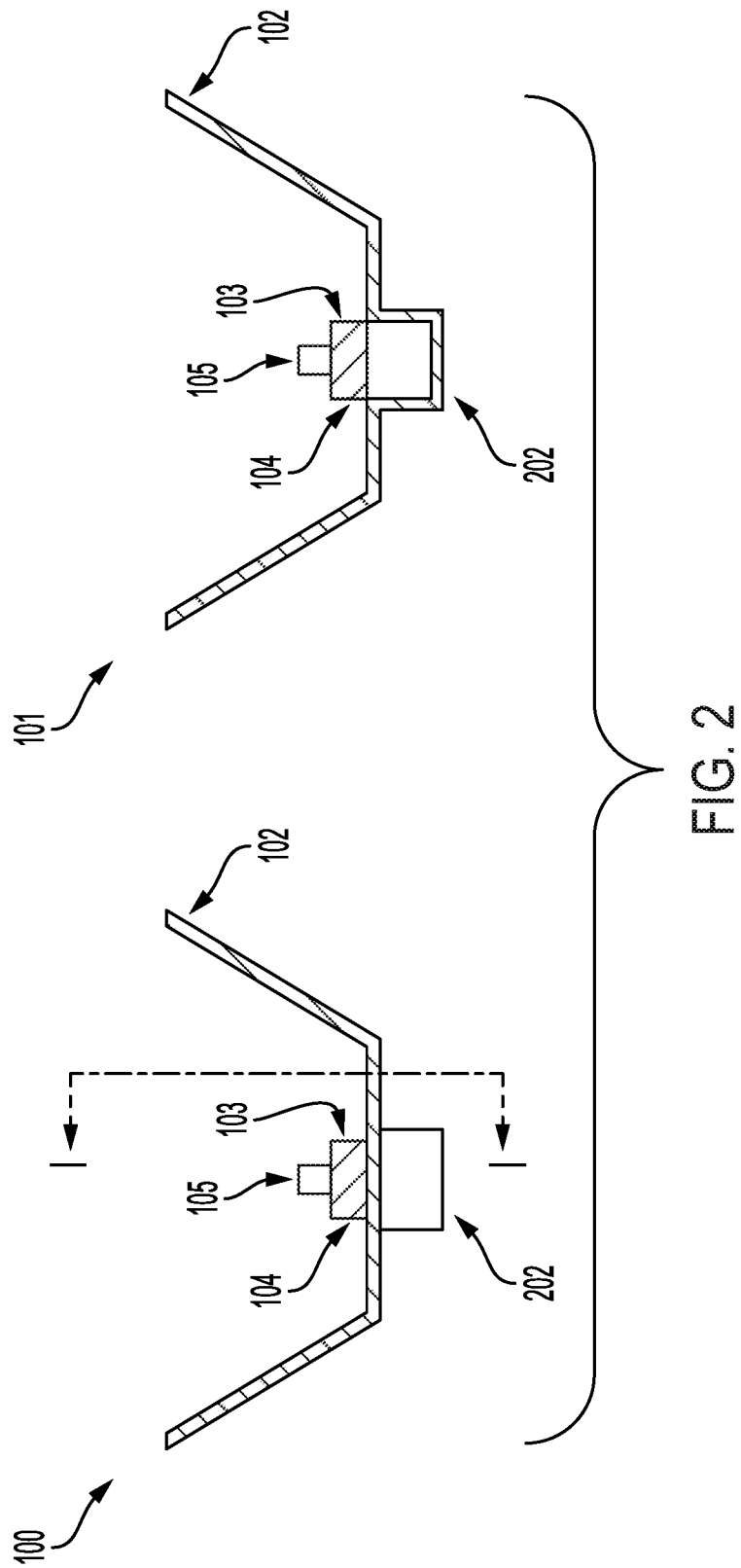
FIG. 2 depicts a cross section of an exemplary lighting fixture with a radiating structure, according to the present disclosure.

FIG. 2 depicts a cross section of a lighting fixture with a radiating structure. More specifically, FIG. 2 depicts a cross section as viewed along a lengthwise axis of the housing. The light engine 104 includes multiple lighting elements 105 mounted to one of more circuit boards, e.g., printed circuit boards (PCBs) 103. The multiple lighting elements 105 can be mounted to printed circuit boards 103 using adhesive or a mechanical connection.

Figure 3:
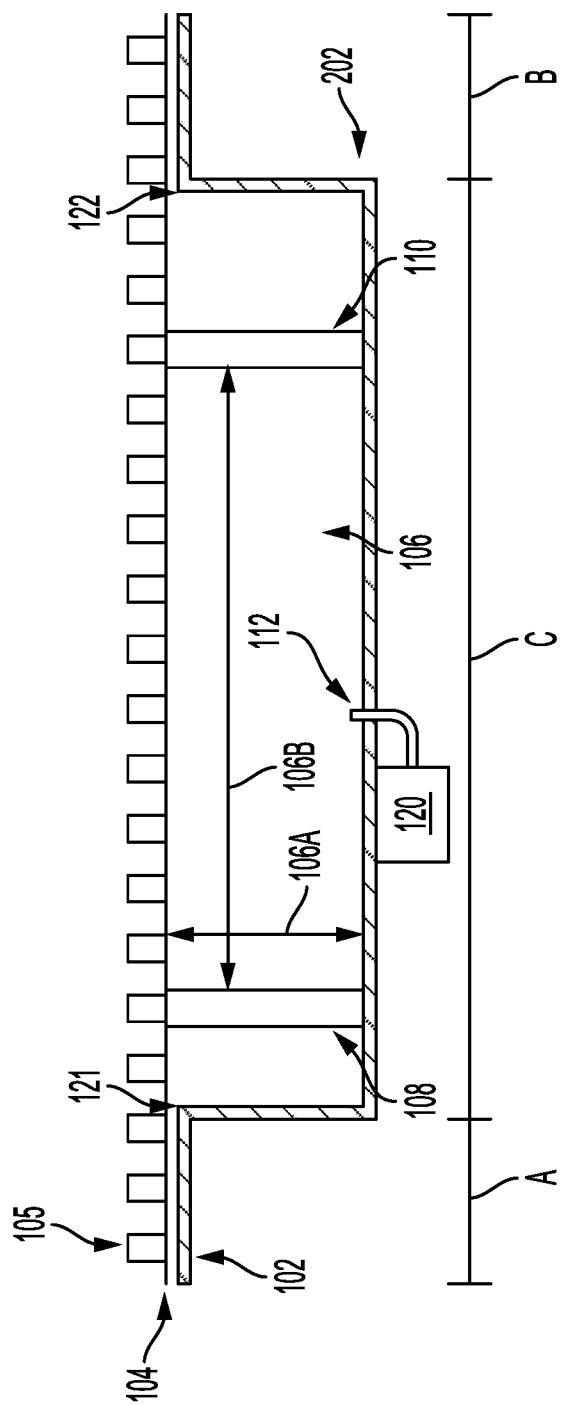
FIG. 3 depicts a cross section of an exemplary lighting fixture with a radiating structure, according to the present disclosure.

FIG. 3 depicts a partial cross section of a lighting fixture with a radiating structure taken along line I-I in FIG. 2. FIG. 3 illustrates that the inner surface of the housing contacts portions of the light engine and is spaced apart from at least one portion of the light engine. FIG. 3 is illustrated with a first section A, a second section B, and a third section C. The inner surface of the housing contacts the side of the light engine opposite the side with the lighting elements in the first section A and second section B in FIG. 3. The contact between the light engine and the housing in the first section A and second section B allows the housing to act as a heat sink for the light engine. In some fixtures, the light engine and the housing are in contact except for the area(s) where an antenna is formed. The inner surface of the housing is spaced apart from the side of the light engine opposite the side with the lighting elements in the third section C in FIG. 3. The spacing between the inner surface of the housing and the light engine may be provided by changing the contour of the housing, changing the contour of the circuit board, or changing a combination of the two.

The gap formed in the area where the inner surface of the housing is spaced apart from the light engine forms an antenna. FIG. 3 illustrates that the light engine is connected to the housing by a first grounding point 108 and a second grounding point 110. The first and second grounding points are also referred to herein as connection points. A connection point electrically connects the circuit board to the housing. For example, a connection point may ground the circuit board to the housing. The gap between the side of the light engine 104 opposite the side with the lighting elements and the inner surface of the housing between the first and second grounding points forms the antenna, specifically the gap between the side of the light engine facing the housing 102, the corresponding portion of the inner surface of the housing 102, and the first and second grounding points.

In FIG. 3, the gap 106 between the light engine and the housing has a width dimension 106A defined by distance between the inner surface of the housing and the side of the circuit board opposite the lighting elements and a length dimension 106B defined by the first grounding point 108 and the second grounding point 110.

The length dimension 106B of the gap corresponds to a desired wavelength relationship (e.g., a quarter wavelength antenna) of the communications radiated by the antenna. In a quarter wavelength configuration, the length dimension 106B of the gap is one quarter of the wavelength of the radiated communication signal. Exemplary antenna gap dimensions are 7 inches of length with a width of 2.5 millimeters. Other configurations of gap length and gap width are possible based on the desired transmission or reception frequency. The length of the gap may be shortened to support higher frequencies or lengthened to support lower frequencies.

FIG. 3 illustrates that the housing includes a recess or a depression 202. The first grounding point 108 and the second grounding point 110 connect the light engine to the inner surface of the housing at points within the recess. FIG. 3 illustrates one possible configuration of the grounding points. The grounding points may be placed at any position within the depressed area, including the edges 121, 122 of the recess to achieve the desired antenna characteristics. Metal wires, strips or other conductors may be used for the grounding points.

The recess may be created in the housing by stamping or any other appropriate forming method. The dimensions of the recess may be selected to accommodate a variety of antennas. For example, by changing the locations of the first and second grounding points within the recess, housings with the same size recess can support antennas with different characteristics. The housing 102 may be a ferrous housing and in some cases it may be steel. The type of material used for the housing may also be a factor in determining the dimensions of the gap for a desired frequency or frequency range. In some configurations, a housing 102 made of non-ferrous material may include a ferrous portion of the housing 102 to form the antenna structure.

In some examples, the gap is filled with a dielectric material, such as polycarbonate acrylnitrile-butadiene-styrene (PC/ABS).

A feeder 112 may be connected to a controller 120 and routed through the housing 102. The feeder can be a coaxial cable, a flexible printed circuit board, or other connector for providing excitation of the antenna from a transceiver (not shown). The feeder may capacitively couple energy to the antenna.

The antenna formed by the gap radiates the communication in the direction away from the inner surface of the housing 102. There is usually a non-metal diffuser placed over the light engine in a lighting fixture so the communication does not have to pass through a metal surface, as it does in some other antennas that use a gap in a metal housing.

Figure 4:
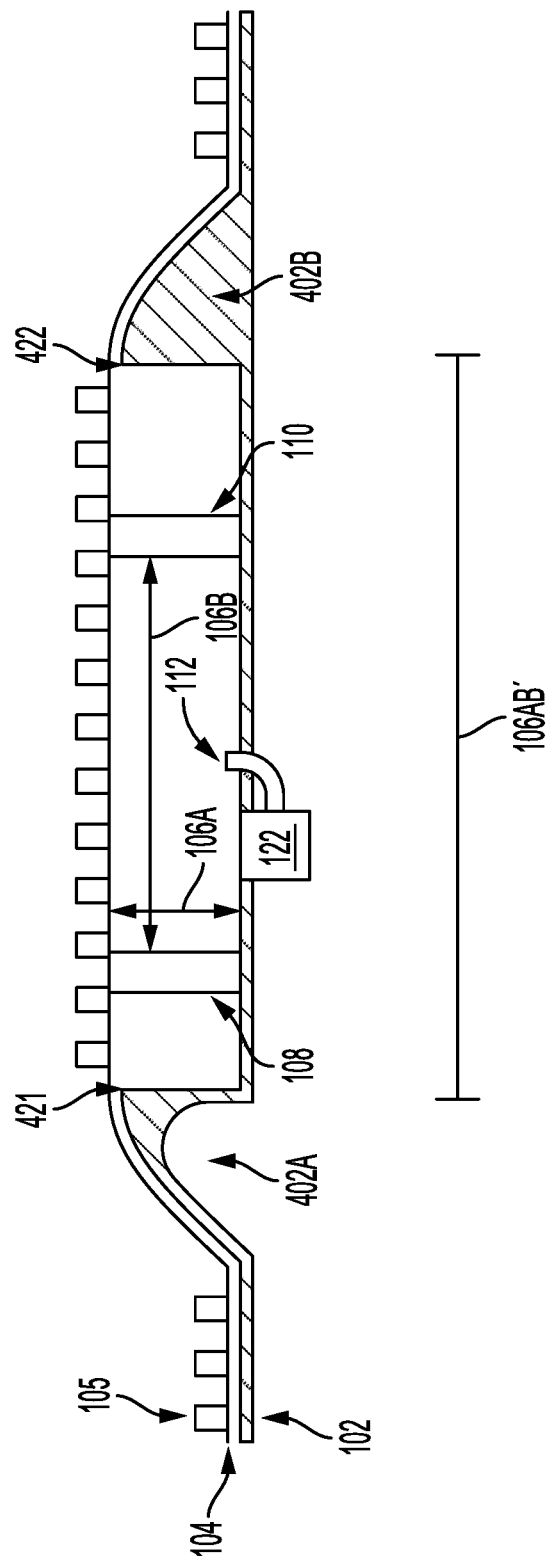
FIG. 4 depicts a cross section of an exemplary lighting fixture with a radiating structure with a stepped light engine, according to the present disclosure.

In another example, the housing includes protrusions or bumps. The gap is formed in the space between the protrusions. FIG. 4 depicts a cross section of another example of a lighting fixture with a housing that provides protrusions. In this example, the light engine 104 is bent or flexed away from the inner surface of the housing by protrusions 402A and 402B, collectively "protrusions 402". The protrusions may be formed by stamping the housing 102 so that protrusions extend inwards, e.g. 402A. Alternatively, the protrusions 402 can be formed by additively manufacturing the protrusions such that an outer surface of the housing 102 retains a linear shape, e.g. 402B. In other alternatives, the protrusions may be a separate component, such as a spacer of PCB, plastic, or other suitable material. The protrusions may have other shapes than those shown in FIG. 4. For example, the protrusions may have a generally rectangular, a generally circular/elliptical, or other generally geometric cross section. Depending on the shape of the protrusions, the light engine may be spaced apart from the inner surface of the housing in areas other than the area between the protrusions. For example, the light engine may be spaced apart from the inner surface of the housing proximate to the protrusion or at point along the contour of the protrusion.

The protrusions cause the light engine to flex away from the inner surface of the housing located between the protrusions. If the protrusions are used as the first and second grounding points instead of using separate grounding points, i.e., 108 and 110 are not used, then the gap has a width dimension of 106A and a length dimension of 106B'. The length dimension 106B' is defined by the corresponding grounding points 421 and 422 co-located with the edges of protrusions 402A and 402B respectively. If separate grounding points 108, 110 are used, then the gap has a width dimension of 106A and a length dimension of 106B.

Figure 5:
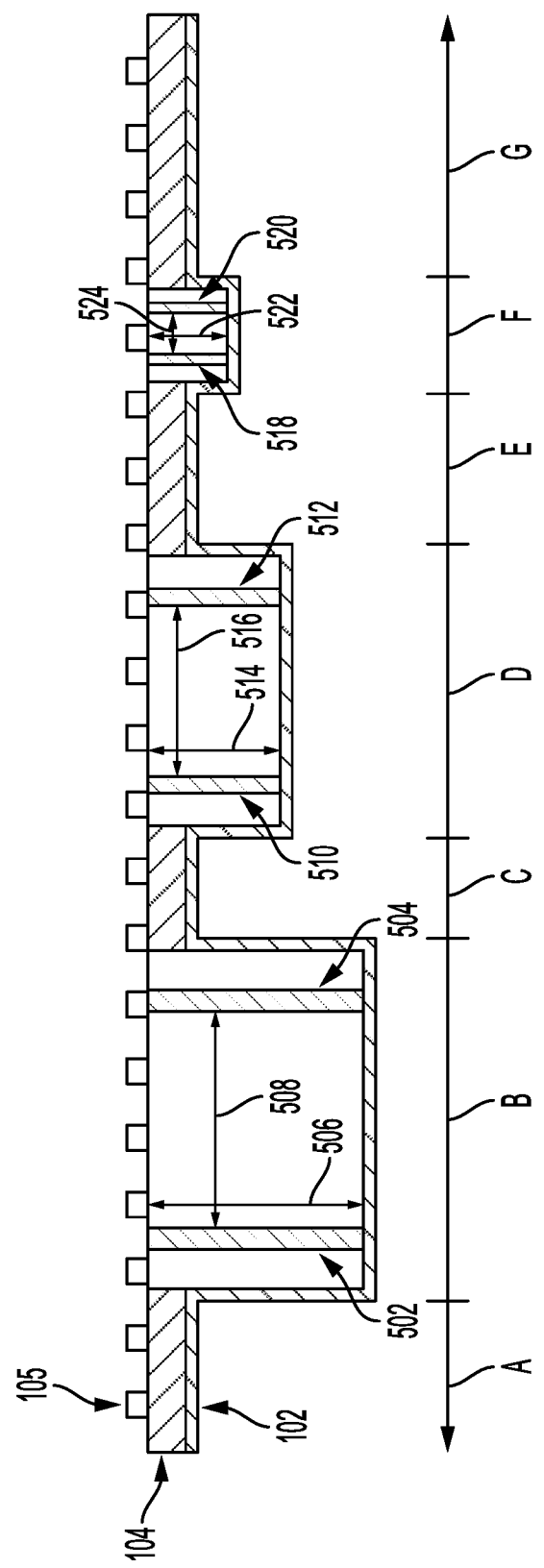
FIG. 5 depicts a cross section of an exemplary lighting fixture with multiple antennas using multiple recesses in the housing, according to the present disclosure.

FIG. 5 depicts a cross section of another lighting fixture with multiple antennas. The lighting fixture has three antennas, each with different frequency characteristics. The housing includes three recesses. In this example, the housing 102 can be stepped such that a first portion A is in contact with the light engine 104, a second portion B is separated from the light engine, a third portion C is in contact with the light engine, a fourth portion D is separated from the light engine, a fifth portion E is in contact with the light engine, a sixth portion F is separated from the light engine, and a seventh portion G is in contact with the light engine 104.

A first antenna is formed in the area around portion B, a second antenna is formed in the area around portion D, and a third antenna is formed in the area around portion F. The first antenna is formed using first and second grounding points 502, 504. The gap for the first antenna is defined by length 508 and width 506. The second antenna is formed using first and second grounding points 510, 512. The gap for the second antenna is defined by length 516 and width 514. The third antenna is formed using first and second grounding points 518, 520. The gap for the third antenna is defined by length 524 and width 522.

In this example, three antennas are shown. Other numbers of antennas are possible. While FIG. 5 shows different widths and lengths of the antennas, in other examples, the dimensions may be the same for each antenna without departing from teachings of the present disclosure. The types of grounding points for the different antennas may also be different. For example, one antenna may use separate grounding points, whereas another antenna may use the edge of the recess in the housing.

Figure 6:
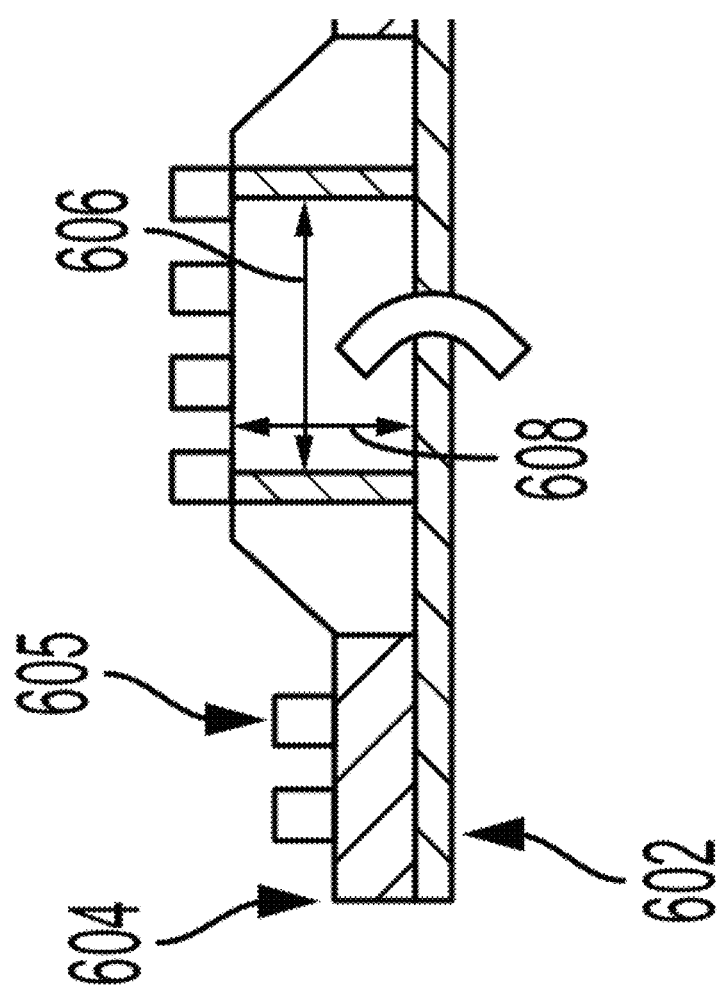
FIG. 6 depicts a cross section of an exemplary lighting fixture with a stepped light engine, according to the present disclosure.

Instead of providing multiple recesses in the housing, the light engine may be flexed in multiple locations to provide multiple antennas. FIG. 6 depicts a cross section of another light fixture with a stepped light engine. In this example, the light engine 604 can be stepped so that the stepped portion of the light engine is spaced apart from the inner surface of the housing. The light engine 604 can be stepped during a manufacturing of the PCB. An example of a manufacturing of a light engine 604 with steps, is to form one or more PCBs with a transition surface. The transition surface connects one or more PCBs that are parallel to the housing 602 to adjust the displacement of the parallel PCBs. The transition surface allows the formation of antenna structures at various widths from the housing 602. In some cases, multiple lighting elements 605 are placed on the linear surfaces (i.e., the surfaces parallel to the housing 602) of the light engine 604. In other cases, multiple lighting elements 605 can also be placed on the surfaces of light engine 604 that are not parallel to the housing 602. In an example, the light engine 604 forms one or more gaps having dimensions defined by a stepped portion of the light engine 604 and the housing 602, and a first grounding point 606 and a second grounding point 608. The light engine 604 can be stepped at various angles based on the manufacturing capabilities and material used to form the light engine 604.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The disclosure is not limited to any specific type of light engine or to a specific type of housing. If the lighting fixture includes multiple light engines, then each light engine may be configured to provide an antenna. The use of "adapted to" or" "configured to" herein is meant as open and inclusive language that does not foreclose devices adapted to or configured to perform additional functions. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A lighting fixture, comprising:
 a housing;
 a light engine including a plurality of lighting elements mounted to a circuit board, wherein the circuit board is attached to an inner surface of the housing;
 a feeder connected to the circuit board and configured for connection to a wireless transceiver; and
 an antenna formed by a gap between a first side of the circuit board and a portion of the inner surface of the housing,
 wherein the first side of the circuit board and a second side of the circuit board are on opposite sides of the circuit board and the lighting elements are mounted on the second side of the circuit board,
 wherein a first end of the gap corresponds to a first grounding point that electrically connects the circuit board and the inner surface of the housing and a second end of the gap corresponds to a second grounding point that electrically connects the circuit board and the inner surface of the housing, and
 wherein a distance between the first grounding point and the second grounding point defines a length of the gap and determines an operational frequency of the antenna.

2. The lighting fixture of claim 1, wherein a first portion of the circuit board is located between a first end of the circuit board and the first grounding point and the first side of the circuit board corresponding to the first portion of the circuit board contacts the inner surface of the housing.

3. The lighting fixture of claim 2, wherein the circuit board includes a transition section between the first side of the first portion of the circuit board and the first side of the circuit board that forms the gap.

4. The lighting fixture of claim 1, wherein the gap is filled by a dielectric.

5. The lighting fixture of claim 1, wherein the inner surface of the housing includes a recess, a length of the recess corresponds to the length of the gap and a first end of the recess corresponds to the first grounding point and a second end of the recess corresponds to the second grounding point.

6. The lighting fixture of claim 1, further comprising a second antenna formed by a second gap between the first side of the circuit board and a second portion of the inner surface of the housing,
 wherein a first end of the second gap corresponds to a third connection point that electrically connects the circuit board and the inner surface of the housing and a second end of the second gap corresponds to a fourth connection point that electrically connects the circuit board and the inner surface of the housing, and
 wherein a distance between the third connection point and the fourth connection point defines a length of the second gap and determines an operational frequency of the second antenna.

7. A lighting fixture, comprising:
a housing; a light engine including a plurality of lighting elements mounted to a circuit board, wherein the circuit board is attached to an inner surface of the housing;
a circuit board attached to a first surface of the housing;
a feeder connected to the circuit board and configured for connection to a wireless transceiver; and
an antenna formed by a gap between a first side of the circuit board and a ferrous portion of the housing,
wherein a first end of the gap corresponds to a portion of the circuit board and a first grounding point that electrically connects the circuit board and the first surface of the housing and a second end of the gap corresponds to a second grounding point that electrically connects the circuit board and the first surface of the housing, and
wherein a distance between the first grounding point and the second grounding point defines a length of the gap and determines an operational frequency of the antenna.

8. The lighting fixture of claim 7, wherein a first portion of the circuit board is located between a first end of the circuit board and the first grounding point and the first side of the circuit board corresponding to the portion of the circuit board contacts the first surface of the housing.

9. The lighting fixture of claim 7, wherein the circuit board includes a stepped section between the first side of the portion of the circuit board and the first side of the circuit board that forms the gap.

10. The lighting fixture of claim 7, wherein the first surface of the housing includes a recess, wherein a length of the recess corresponds to the length of the gap and a first end of the recess corresponds to the first grounding point and a second end of the recess corresponds to the second grounding point.

11. The lighting fixture of claim 7, further comprising a second antenna formed by a second gap between the first side of the circuit board and an additional ferrous portion attached to the first surface of the housing,
wherein a first end of the second gap corresponds to a third connection point that electrically connects the circuit board and the first surface of the housing and a second end of the second gap corresponds to a fourth connection point that electrically connects the circuit board and the first surface of the housing, and
wherein a distance between the third connection point and the fourth connection point defines a length of the second gap and determines an operational frequency of the second antenna.

12. A lighting fixture comprising:
a housing; a light engine including a plurality of lighting elements mounted to a circuit board, wherein the circuit board is attached to an inner surface of the housing;
a circuit board attached to a first surface of the housing;
a feeder connected to the circuit board and configured for connection to a wireless transceiver;
a first antenna formed by a gap between a first side of the circuit board and a ferrous portion of the first surface of the housing; and
a second antenna formed by a second gap between the first side of the circuit board and the first surface of the housing,
wherein a first end of the second gap corresponds to a third connection point that electrically connects the circuit board and the first surface of the housing and a second end of the second gap corresponds to a fourth connection point that electrically connects the circuit board and the first surface of the housing, and
wherein a distance between the third connection point and the fourth connection point defines a length of the second gap and determines an operational frequency of the second antenna.

13. The lighting fixture of claim 12, wherein a first end of the gap corresponds to a first grounding point that electrically connects the circuit board and the first surface of the housing and a second end of the gap corresponds to a second grounding point that electrically connects the circuit board and the first surface of the housing, and
wherein a distance between the first grounding point and the second grounding point defines a length of the gap and determines an operational frequency of the antenna.

14. The lighting fixture of claim 12, wherein a light engine including a plurality of lighting elements mounted to the circuit board.

15. The lighting fixture of claim 12, wherein the circuit board includes a transition section between a first side of the circuit board that is attached to the first surface of the housing and the first side of the circuit board that forms the gap.

16. The lighting fixture of claim 12, wherein the gap is filled by a dielectric.

* * * * *